(12) United States Patent
Wong

(10) Patent No.: US 11,176,569 B2
(45) Date of Patent: Nov. 16, 2021

(54) MANAGER SPECIAL

(71) Applicant: 3Forces Inc., Scottsdale, AZ (US)

(72) Inventor: Keith Wong, Scottsdale, AZ (US)

(73) Assignee: 3Forces Inc., Scottsdale, AZ (US)

( * ) Notice: Subject to any disclaimer, the term of this patent is extended or adjusted under 35 U.S.C. 154(b) by 106 days.

(21) Appl. No.: 16/534,944

(22) Filed: Aug. 7, 2019

(65) Prior Publication Data
US 2021/0042781 A1 Feb. 11, 2021

(51) Int. Cl.
*G06Q 30/02* (2012.01)
*G06Q 30/06* (2012.01)

(52) U.S. Cl.
CPC ..... *G06Q 30/0235* (2013.01); *G06Q 30/0223* (2013.01); *G06Q 30/0623* (2013.01)

(58) Field of Classification Search
CPC .......... G06Q 30/0623; G06Q 30/0223; G06Q 30/0235
See application file for complete search history.

(56) References Cited

U.S. PATENT DOCUMENTS

| | | | | |
|---|---|---|---|---|
| 2002/0178093 A1* | 11/2002 | Dean | .................. | G06Q 30/0641 705/28 |
| 2003/0233278 A1* | 12/2003 | Marshall | ............ | G06Q 30/0212 705/14.35 |
| 2012/0150653 A1* | 6/2012 | Bennett | .............. | G06Q 30/0253 705/14.58 |
| 2013/0159084 A1* | 6/2013 | Smith | ................ | G06Q 30/0226 705/14.27 |
| 2014/0214486 A1* | 7/2014 | Greystoke | .......... | G06Q 30/0201 705/7.29 |
| 2016/0350808 A1* | 12/2016 | Zhang | ................ | G06Q 30/0261 |
| 2017/0316459 A1* | 11/2017 | Strauss | ................ | G06Q 10/067 |
| 2018/0053140 A1* | 2/2018 | Baca | .................... | G06Q 10/087 |

OTHER PUBLICATIONS

Sasser, Match Supply and Demand in Service Industries, Nov. 1976, Harvard Business Review (Year: 1976).*

* cited by examiner

*Primary Examiner* — David J Stoltenberg
*Assistant Examiner* — Michael J Cross
(74) *Attorney, Agent, or Firm* — Ellenoff Grossman & Schole LLP; James M. Smedley; Alex Korona

(57) ABSTRACT

Apparatus and associated methods relate to offering a discounted product requested by a buyer, with offer parameters determined as a function of the discounted product request, in response to detecting a predetermined product demand characteristic, and at a location, time, and discount based on the offer. In an illustrative example, offer parameters may include quantity, location, or time. The product request may be, for example, a request for a discounted product quantity at a requested location and time. In some examples, the product demand characteristic may be demand as a function of time. The discounted product may be provided at a time and location based on a discount code generated for the product. Various examples may advantageously increase revenue limited by off-peak hour and end of day demand characteristics, for example, offering products discounted in response to demand inadequate to consume time-valued inventory and/or to better utilize operation capacity, so that the seller may increase profit.

20 Claims, 8 Drawing Sheets

MANAGER SPECIAL

TECHNICAL FIELD

Various embodiments relate generally to automatic discount distribution.

BACKGROUND

A product is a good or service. A product may be offered for purchase at a price. Some product prices may be determined based on economic principles. For example, a product price may be determined as a function of the product supply and demand for the product. In an illustrative example, product supply and product demand may vary as functions of time. In some scenarios, supply and demand may be determined as a function of location.

The demand for some time-valued products may be difficult to match to transient demand. For example, some products, such as food items, may last only a short time before they must be discarded. Such discarded product supply represents a monetary loss to a business selling the product. Some businesses experience variable demand throughout the business day. During periods of peak demand, a restaurant may be barely able to create adequate supply in terms of raw materials and operation capacity (staff, fixed overheads, and space capacity) to satisfy demand. In off-peak periods, the same restaurant may have excess food inventory and operation capacity that will become a monetary loss if the excess food is not sold before spoilage and the excess operation capacity is not deployed.

Some business models include offering product at a discounted price to increase demand. Such a discount-based demand enhancement technique may be difficult to effectively implement for businesses selling products having variable demand rates. In an illustrative example, a restaurant business selling sandwiches may have increased demand during a typically slow time period, due to participants in a nearby convention unexpectedly visiting for lunch. In response to the increased demand, the restaurant manager may make extra sandwiches, only to enter off-peak hours later the same day with excess inventory and or operation capacity. Effectively matching supply to variable demand may be very difficult.

SUMMARY

Apparatus and associated methods relate to offering a discounted product requested by a buyer, with offer parameters determined as a function of the discounted product request, in response to detecting a predetermined product demand characteristic, and at a location, time, and discount based on the offer. In an illustrative example, offer parameters may include quantity, location, or time. The product request may be, for example, a request for a discounted product quantity at a requested location and time. In some examples, the product demand characteristic may be demand as a function of time. The discounted product may be provided at a time and location based on a discount code generated for the product. Various examples may advantageously increase revenue limited by off-peak hour and end of day demand characteristics, for example, offering products discounted in response to demand inadequate to consume time-valued inventory and or operation capacity, so that the seller may increase profit.

Various embodiments may achieve one or more advantages. For example, some embodiments may increase the revenue for a seller's business. Such increased business revenue may be a result of reducing the seller's effort distributing product discounts. Various implementations may increase profit from a seller's business. This facilitation may be a result of increasing demand limited by off-peak hour and end of day demand characteristics based on automatically generating and distributing discounts targeted to increasing off-peak or end of day demand. Some embodiments may reduce operating cost for a seller's business. Such reduced operating cost may be a result of automatically generating and distributing discounts targeted to increase short-term demand for time-valued inventory and or better utilize operation capacity. In an illustrative example, time-valued inventory such as, for example, a perishable food item may be sold at a substantial discount yet achieve an operating cost reduction relative to discarding the item, which may result in a monetary loss of the undiscounted value. Some embodiments may restore revenue that would have been lost to low off-peak hour and end of day demand. Such restored revenue during off-peak or end of day periods may be a result of reducing the seller's effort distributing product discounts to increase demand for time-valued product inventory and or better utilize operation capacity.

In some embodiments, demand may be automatically increased for a seller's supply. Such automatic demand increase may be a result of automatically generating and distributing product discounts in response to demand inadequate to consume time-valued inventory and excess operation capacity during an off-peak or end of day period, reducing a seller's exposure to monetary loss due to discarded excess inventory. Various implementations may reduce a seller's effort matching the product supply provided by the seller's business to the demand for the product. This facilitation may be a result of automatically adapting demand to supply, based on offering products discounted in response to demand inadequate to consume time-valued inventory and or better utilize operation capacity. Some embodiments may improve a user's response time adapting the product supply provided by the user's business to the demand for the product. Such improved response time adapting product supply to demand may be a result of automatically distributing product discounts to increase demand before the product becomes a monetary loss to the business. In an illustrative example, a restaurant or deli having a small number of food items that will have to be discarded at close of business may reduce losses and increase profit as a result of generating and distributing a discount determined as a function of time remaining to expiration, permitting a potential buyer to obtain the product at the discounted price while enabling the business to reduce loss and improve profit.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 6:
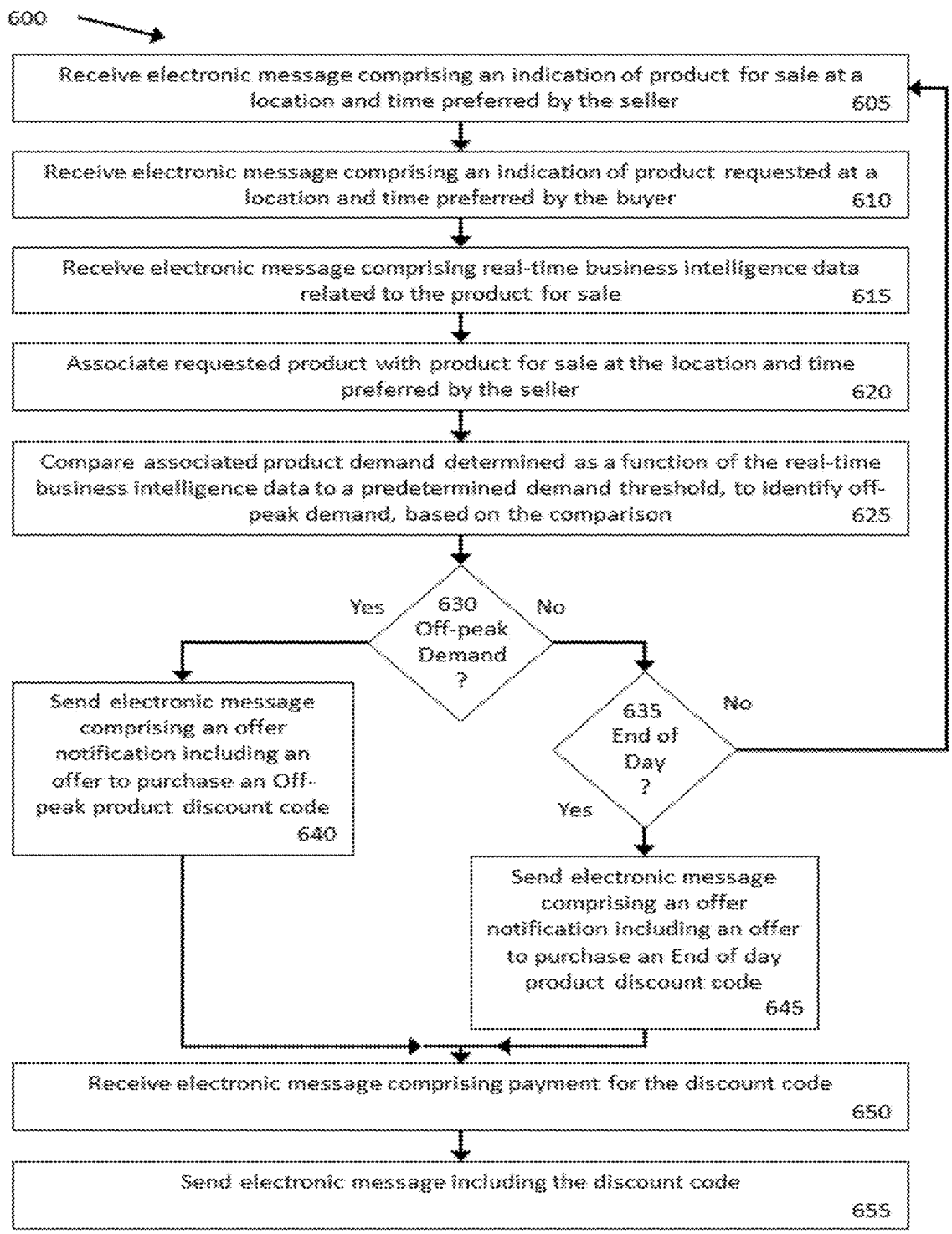
FIG. 6 depicts an exemplary process flow of an embodiment Platform Discount Distribution Engine (PDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.
Figure 7:
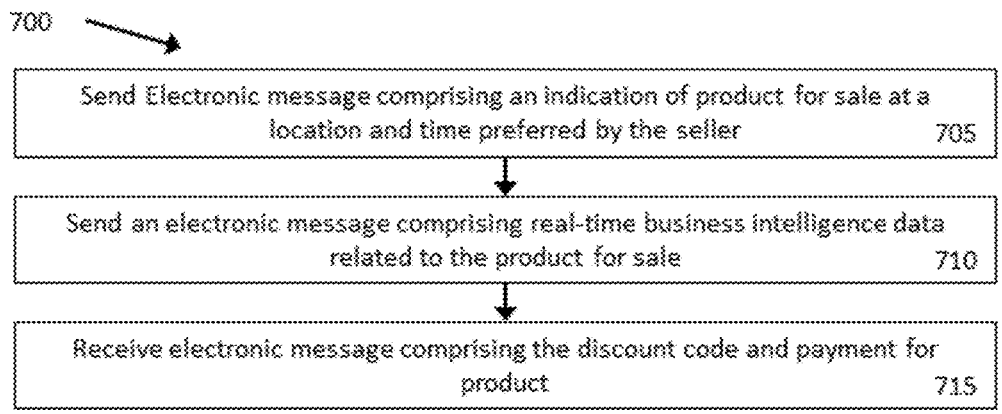
FIG. 7 depicts an exemplary process flow of an embodiment Seller Discount Distribution Engine (SDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.
Figure 8:
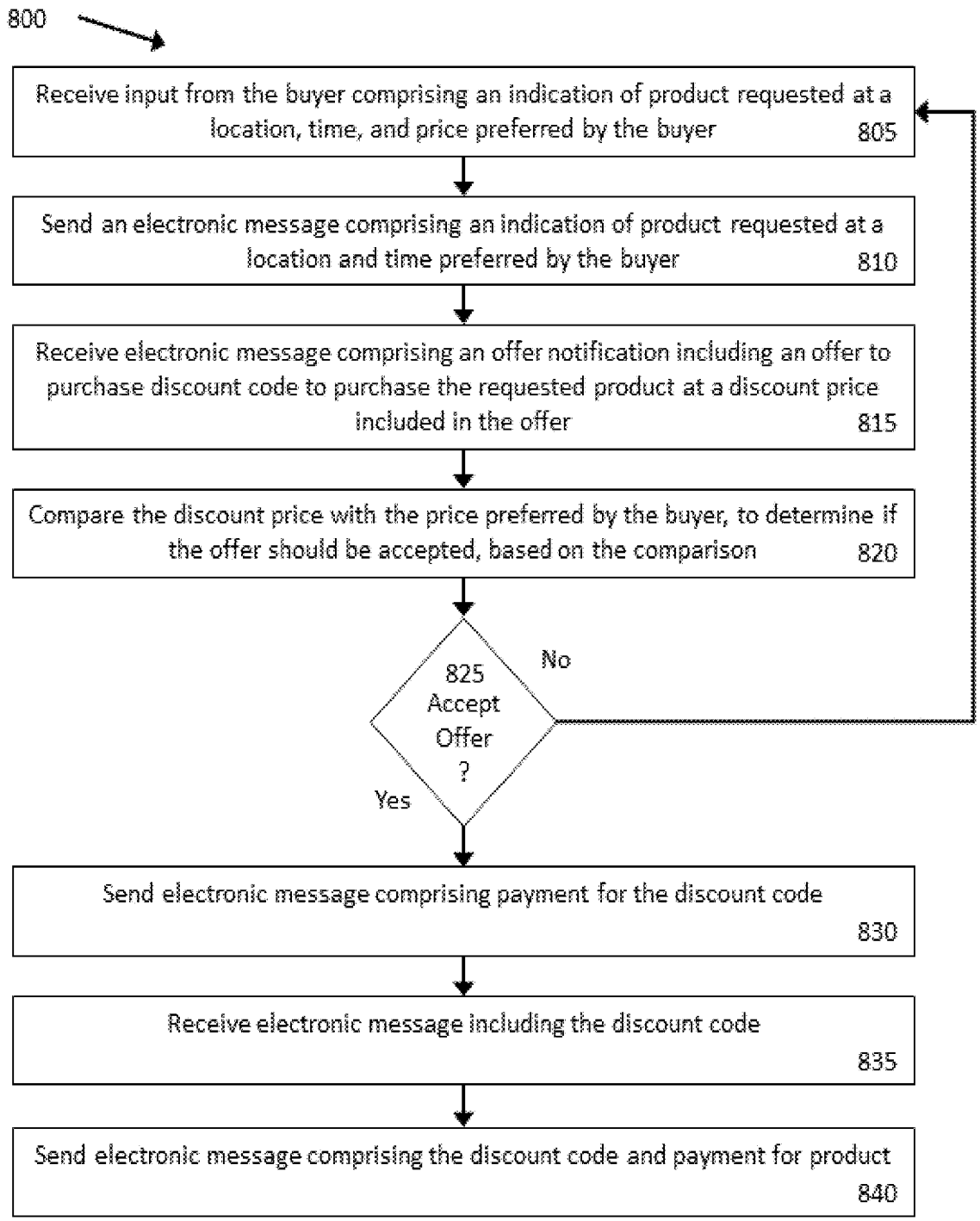
FIG. 8 depicts an exemplary process flow of an embodiment Buyer Discount Distribution Engine (BDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.

To aid understanding, this document is organized as follows. First, an exemplary discount distribution apparatus and method designed to increase revenue limited by off-peak hour and end of day demand characteristics is briefly introduced with reference to FIG. 1. Second, with reference to FIGS. 2-5, the discussion turns to exemplary embodiments that illustrate systems designed to increase revenue limited by off-peak hour and end of day demand characteristics. Specifically, an exemplary discount distribution network configured with an embodiment discount distribution platform, seller discount distribution device, and buyer discount distribution device, is disclosed. Finally, with reference to FIGS. 6-8, illustrative process flows of exemplary Platform Discount Distribution Engine (PDDE), Seller Discount Distribution Engine (SDDE), and Buyer Discount Distribution Engine (BDDE) embodiment implementations are described, to explain improvements in discount distribution technology.

Figure 1:
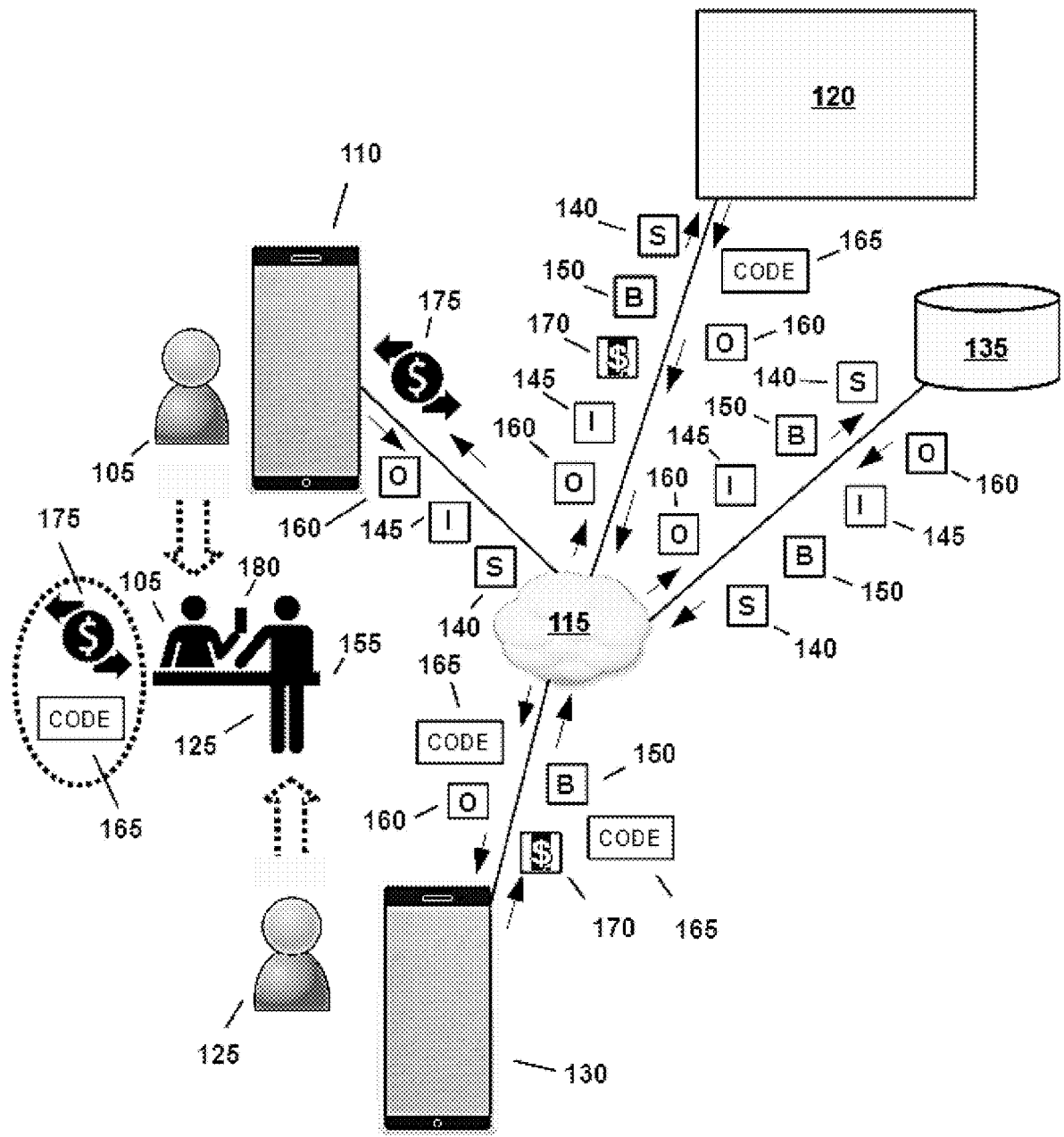
FIG. 1 depicts an illustrative operational scenario wherein a seller employs an exemplary discount distribution system configured to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.

FIG. 1 depicts an illustrative operational scenario wherein a seller employs an exemplary discount distribution system configured to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. In the example depicted by FIG. 1, the seller 105 employs the seller mobile device 110 via the network cloud 115 to configure the discount distribution platform 120 to increase the seller 105 revenue. In the illustrated example, the seller 105 revenue is limited by off-peak hour and end of day demand characteristics. In some exemplary scenarios, reduced product demand or a reduced product sale rate during an off-peak hour or end of day period may result in reduced revenue that may result in a monetary business loss in view of fixed business operation cost. In the illustrated example, the discount distribution platform 120 is operable to increase revenue limited by off-peak hour and end of day demand characteristics based on automatically offering the buyer 125 a product at a price determined as a function of time, and at a location and time requested by the buyer 125 and agreed to by the seller 105. In the illustrated example, the price determined as a function of time may be a discount based on a time offset from a predetermined reference time. In various embodiments, the predetermined reference time may be an off-peak time period, or a range of off-peak times, or an end of day time period. In various examples, an off-peak time period may be a time when a business experiences less than peak demand for a product and or the seller's operation capacity is not fully utilized. In some examples, an end of day time period may be a time when a time-valued product, such as, for example, a perishable food item, must be discarded if not sold before close of business. In the depicted example, the buyer 125 uses the buyer mobile device 130 via the network cloud 115 to shop for a discounted product. In the illustrated example, the discount distribution database 135 is operably coupled via the network cloud 115 to retrievably store and provide access to product, offer, transaction, and account data generated by the seller mobile device 110, the discount distribution platform 120, and the buyer mobile device 130. In the depicted example, the seller 105 mobile device 110 configures the discount distribution platform 120 with the seller 105 product for sale 140. In the illustrated example, the seller 105 mobile device 110 generates real time business intelligence data 145 determined as a function of the product for sale 140 demand characteristics. In various examples, the real time business intelligence data 145 may include the sales rate of the product for sale 140. In some embodiments, the real time business intelligence data 145 may include the inventory level of the product for sale 140. In some designs, the real time business intelligence data 145 may include the location of the product for sale 140. In the depicted example, the buyer 125 mobile device 130 configures the discount distribution platform 120 with the buyer 125 request including the buyer 125 requested product 150. In the illustrated example, the buyer 125 request includes the location and time 155 requested by the buyer 125. In some embodiments, the buyer 125 request may include a price, price range, or price threshold. In the illustrated example, the discount distribution platform 120 detects demand insufficient to consume supply of the product for sale 140 at the location and time 155 requested by the buyer 125, based on the real time business intelligence data 145 received from the seller mobile device 110. In the depicted embodiment, the discount distribution platform 120 determines a discount price for the product for sale 140 as a function of time. In an illustrative example, the discount price of the product for sale 140 may be determined by the discount distribution platform 120 as a function of the product cost to the seller 105. In some examples, the discount price of the product for sale 140 may be determined by the discount distribution platform 120 based on a time scale, wherein the discount price is proportional to the time remaining before a predetermined end of day period ends. In an illustrative example, the discount price may be determined by the discount distribution platform 120 based on predetermined off-peak beginning and end times. In the depicted example, the discount distribution platform 120 associates the seller 105 product for sale 140 with the buyer 125 requested product 150 and generates the offer notification 160, based on associating the seller 105 product for sale 140 with the buyer 125 requested product 150. In various embodiments, the discount distribution platform 120 may associate the seller 105 product for sale 140 with the buyer 125 requested product 150 based on location, demand, or price data. In the illustrated example, the discount distribution platform 120 sends the offer notification 160 to the buyer 125 mobile device 130. In the depicted embodiment, the offer notification 160 sent to the buyer 125 mobile device 130 by the discount distribution platform 120 includes an offer for the buyer 125 to purchase the buyer 125 requested product 150 at a discount price determined as a function of time, and at the location and time requested by the buyer 125 and agreed to by the seller 105. In the illustrated embodiment, the offer notification includes 160 includes an offer to the buyer 125 from the discount distribution platform 120 for the buyer 125 to purchase the discount code 165 authorizing the buyer 125 to purchase the requested product 150 at the discount price included in the offer notification 160. In the depicted embodiment, the buyer 125 purchases the discount code 165 by authorizing discount code payment 170 from the buyer 125 mobile device 130 to the discount distribution platform 120. In the illustrated embodiment, the discount distribution platform 120 sells the discount code 165 to the buyer 125, and the discount distribution platform 120 collects the discount code payment 170 fee. In the depicted example, the seller 105 does not pay a fee for use of the discount distribution platform 120. In the illustrated example, the buyer 125 uses the discount code 165 to complete the transaction 175, to purchase the buyer 125 requested product 150 at the discounted price, as the discounted product 180, at the location and time 155 requested by the buyer 125 and agreed to by the seller 105.

Figure 2:
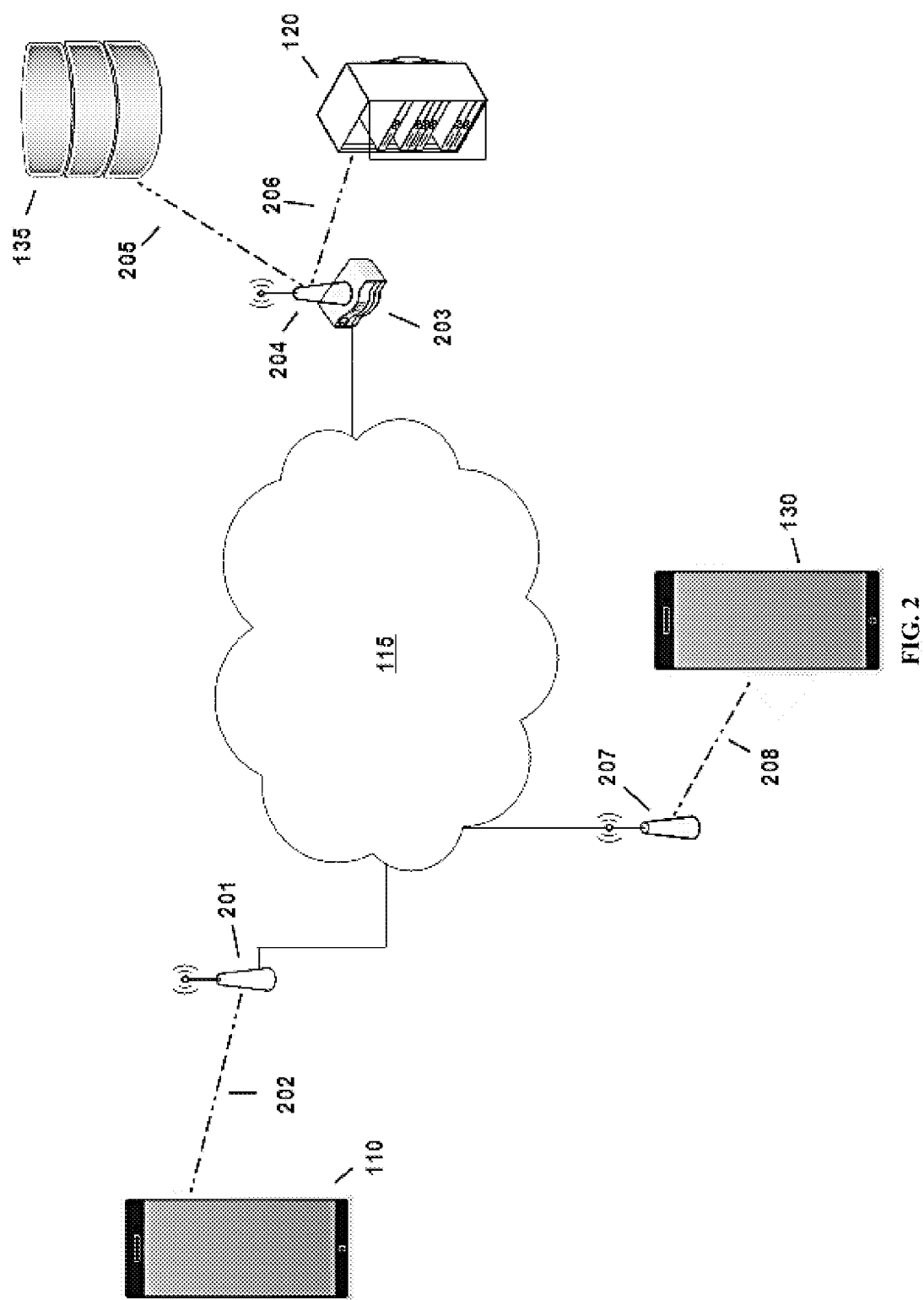
FIG. 2 depicts a schematic view of an exemplary discount distribution network configured to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.

FIG. 2 depicts a schematic view of an exemplary discount distribution network configured to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. In FIG. 2, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In the depicted embodiment, an exemplary system includes the exemplary discount distribution platform 120 configured to increase revenue limited by off-peak hour and end of day demand characteristics based on automatically offering a targeted discount to a buyer. In the illustrated embodiment, the seller mobile device 110 is a smart phone configured to activate the discount distribution platform 120 to automatically offer the seller's products to a buyer at a discount. In the depicted example, the buyer's mobile device 130 is a smartphone configured to permit a buyer to interact with the discount distribution platform 120 to receive an offer notification permitting the buyer to purchase a discounted product requested by the buyer. In the illustrated embodiment, the discount distribution database 135 is a cloud-connected storage-as-a-service data repository configured to retrievably store and provide access to product, offer, transaction, and account data generated by the seller mobile device 110, the discount distribution platform 120, and the buyer mobile device 130. In the depicted example, the seller mobile device 110 is communicatively and operably coupled by the wireless access point 201 and the wireless link 202 with the network cloud 115 (for example, the Internet) to send, retrieve, or manipulate information in storage devices, servers, and network components, and exchange information with various other systems and devices via the network cloud 115. In the depicted example, the illustrative system includes the router 203 configured to communicatively and operably couple the wireless access point 204 to the network cloud 115. In the illustrated example, the wireless access point 204 communicatively and operably couples the discount distribution database 135 to the network cloud 115 via the wireless communication link 205. In the depicted example, the wireless access point 204 also communicatively and operably couples the discount distribution platform 120 to the network cloud 115 via the wireless communication link 206. In the depicted embodiment, the buyer mobile device 130 is communicatively and operably coupled with the network cloud 115 by the wireless access point 207 and the wireless communication link 208. In various examples, one or more of the seller mobile device 110, the discount distribution platform 120, the buyer mobile device 130, or the discount distribution database 135 may include an application server configured to store or provide access to information used by the system. In various embodiments, one or more application server may retrieve or manipulate information in storage devices and exchange information through the network cloud 115. In some examples, one or more of the seller mobile device 110, the discount distribution platform 120, the buyer mobile device 130, or the discount distribution database 135 may include various applications implemented as processor-executable program instructions. In some embodiments, various processor-executable program instruction applications may also be used to manipulate information stored remotely and process and analyze data stored remotely across the network cloud 115 (for example, the Internet). According to an exemplary embodiment, as shown in FIG. 2, exchange of information through the network cloud 115 or other network may occur through one or more high speed connections. In some cases, high speed connections may be over-the-air (OTA), passed through networked systems, directly connected to one or more network cloud 115 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 115 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of the seller mobile device 110, the discount distribution platform 120, the buyer mobile device 130, or the discount distribution database 135 via the network cloud 115 or other network in numerous ways. For instance, a component or module may connect to the system i) through a computing device directly connected to the network cloud 115, through a computing device connected to the network cloud 115 through a routing device, or through a computing device connected to a wireless access point. One of ordinary skill in the art will appreciate that there are numerous ways that a component or module may connect to a device via network cloud 115 or other network, and embodiments of the present disclosure are contemplated for use with any network connection method. In various examples, one or more of the seller mobile device 110, the discount distribution platform 120, the buyer mobile device 130, or the discount distribution database 135 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
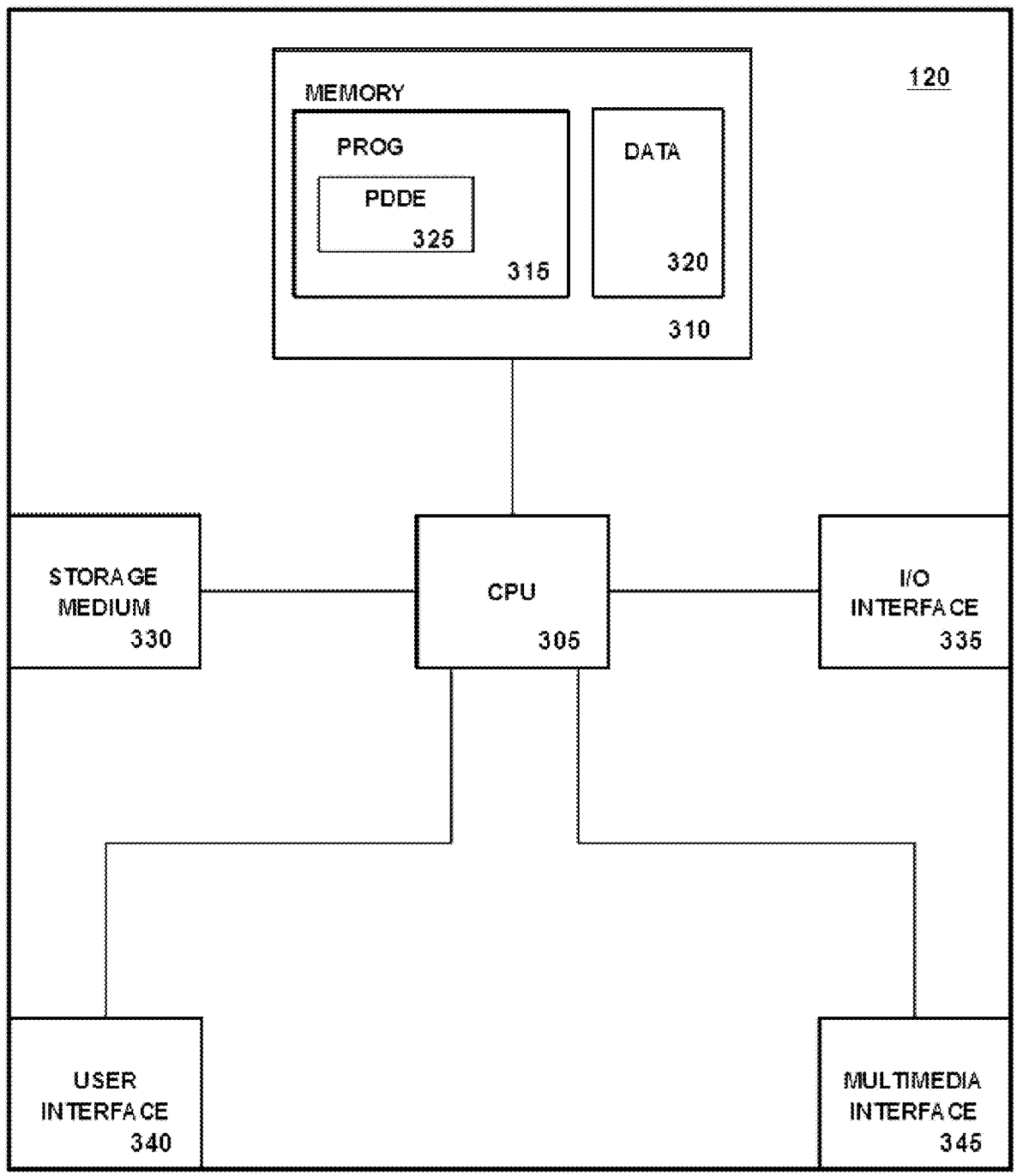
FIG. 3 depicts a structural view of an exemplary discount distribution platform configured with an exemplary Platform Discount Distribution Engine (PDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.

FIG. 3 depicts a structural view of an exemplary discount distribution platform configured with an exemplary Platform Discount Distribution Engine (PDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. In FIG. 3, the block diagram of the exemplary discount distribution platform 120 includes processor 305 and memory 310. The processor 305 is in electrical communication with the memory 310. The depicted memory 310 includes program memory 315 and data memory 320. The depicted program memory 315 includes processor-executable program instructions implementing the PDDE (Platform Discount Distribution Engine) 325. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the depicted embodiment, the processor 305 is communicatively and operably coupled with the storage medium 330. In the depicted embodiment, the processor 305 is communicatively and operably coupled with the I/O (Input/Output) interface 335. In the depicted embodiment, the I/O interface 335 includes a network interface. In various implementations, the network interface may be a wireless network interface. In some designs, the network interface may be a Wi-Fi interface. In some embodiments, the network interface may be a Bluetooth interface. In an illustrative example, the discount distribution platform 120 may include more than one network interface. In some designs, the network interface may be a wireline interface. In some designs, the network interface may be omitted. In the depicted embodiment, the processor 305 is communicatively and operably coupled with the user interface 340. In various implementations, the user interface 340 may be adapted to receive input from a user or send output to a user. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the discount distribution platform 120 may include an accelerometer operably coupled with the processor 305. In various embodiments, the discount distribution platform 120 may include a GPS module operably coupled with the processor 305. In an illustrative example, the discount distribution platform 120 may include a magnetometer operably coupled with the processor 305. In some embodiments, the user interface 340 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the discount distribution platform 120. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. In some embodiments, the multimedia interface 345 may be omitted. Useful examples of the illustrated discount distribution platform 120 include, but are not limited to, personal computers, servers, tablet PCs, smartphones, or other computing devices. In some embodiments, multiple discount distribution platform 120 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary discount distribution platform 120 design may be realized in a distributed implementation. In an illustrative example, some discount distribution platform 120 designs may be partitioned between a client device, such as, for example, a phone, and, a more powerful server system, as depicted, for example, in FIG. 2. In various designs, a discount distribution platform 120 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary discount distribution platform 120 may be configured to operate on a device with less processing power, such as, for example, various gaming consoles, which may not have sufficient processor power, or a suitable CPU architecture, to adequately support discount distribution platform 120. Various embodiment designs configured to operate on a such a device with reduced processor power may work in conjunction with a more powerful server system.

Figure 4:
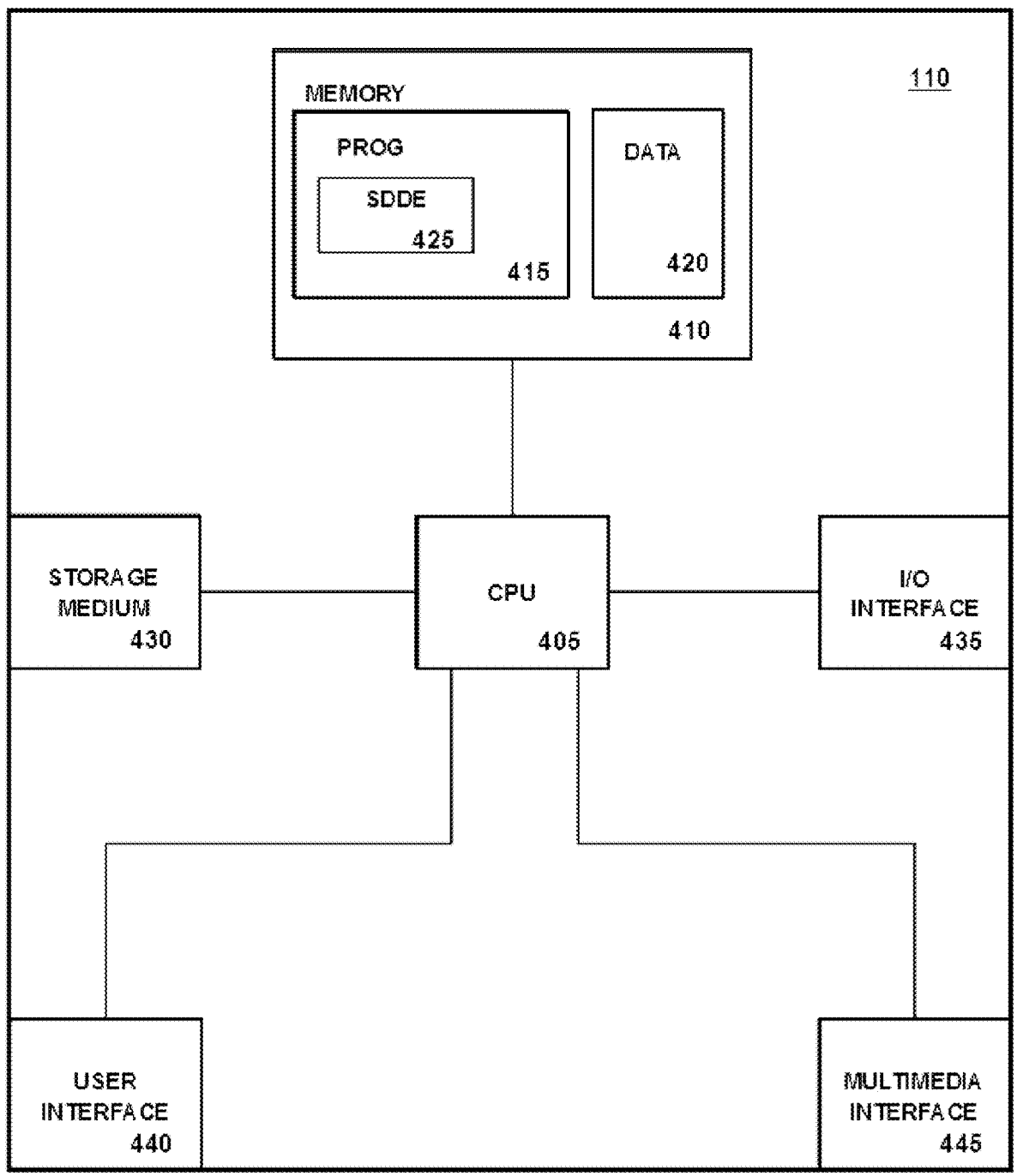
FIG. 4 depicts a structural view of an exemplary seller discount distribution device configured with an exemplary Seller Discount Distribution Engine (SDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.

FIG. 4 depicts a structural view of an exemplary seller discount distribution device configured with an exemplary Seller Discount Distribution Engine (SDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. In FIG. 4, the block diagram of the exemplary seller mobile device 110 includes processor 405 and memory 410. The processor 405 is in electrical communication with the memory 410. The depicted memory 410 includes program memory 415 and data memory 420. The depicted program memory 415 includes processor-executable program instructions implementing the SDDE (Seller Discount Distribution Engine) 425. In some embodiments, the illustrated program memory 415 may include processor-executable program instructions configured to implement an OS (Operating System). In various embodiments, the OS may include processor executable program instructions configured to implement various operations when executed by the processor 405. In some embodiments, the OS may be omitted. In some embodiments, the illustrated program memory 415 may include processor-executable program instructions configured to implement various Application Software. In various embodiments, the Application Software may include processor executable program instructions configured to implement various operations when executed by the processor 405. In some embodiments, the Application Software may be omitted. In the depicted embodiment, the processor 405 is communicatively and operably coupled with the storage medium 430. In the depicted embodiment, the processor 405 is communicatively and operably coupled with the I/O (Input/Output) interface 435. In the depicted embodiment, the I/O interface 435 includes a network interface. In various implementations, the network interface may be a wireless network interface. In some designs, the network interface may be a Wi-Fi interface. In some embodiments, the network interface may be a Bluetooth interface. In an illustrative example, the seller mobile device 110 may include more than one network interface. In some designs, the network interface may be a wireline interface. In some designs, the network interface may be omitted. In the depicted embodiment, the processor 405 is communicatively and operably coupled with the user interface 440. In various implementations, the user interface 440 may be adapted to receive input from a user or send output to a user. In some embodiments, the user interface 440 may be adapted to an input-only or output-only user interface mode. In various implementations, the user interface 440 may include an imaging display. In some embodiments, the user interface 440 may include an audio interface. In some designs, the audio interface may include an audio input. In various designs, the audio interface may include an audio output. In some implementations, the user interface 440 may be touch-sensitive. In some designs, the seller mobile device 110 may include an accelerometer operably coupled with the processor 405. In various embodiments, the seller mobile device 110 may include a GPS module operably coupled with the processor 405. In an illustrative example, the seller mobile device 110 may include a magnetometer operably coupled with the processor 405. In some embodiments, the user interface 440 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 410 may contain processor executable program instruction modules configurable by the processor 405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 410 may contain processor executable program instruction modules configurable by the processor 405 to be adapted to provide audio input capability, audio output capability, audio sampling, spectral audio analysis, correlation, autocorrelation, Fourier transforms, audio buffering audio filtering operations including adjusting frequency response and attenuation characteristics of temporal domain and frequency domain filters, audio pattern recognition, or anomaly detection. In the depicted embodiment, the processor 405 is communicatively and operably coupled with the multimedia interface 445. In the illustrated embodiment, the multimedia interface 445 includes interfaces adapted to input and output of audio, video, and image data. In some embodiments, the multimedia interface 445 may include one or more still image camera or video camera. In various designs, the multimedia interface 445 may include one or more microphone. In some implementations, the multimedia interface 445 may include a wireless communication means configured to operably and communicatively couple the multimedia interface 445 with a multimedia data source or sink external to the seller mobile device 110. In various designs, the multimedia interface 445 may include interfaces adapted to send, receive, or process encoded audio or video. In various embodiments, the multimedia interface 445 may include one or more video, image, or audio encoder. In various designs, the multimedia interface 445 may include one or more video, image, or audio decoder. In various implementations, the multimedia interface 445 may include interfaces adapted to send, receive, or process one or more multimedia stream. In various implementations, the multimedia interface 445 may include a GPU. In some embodiments, the multimedia interface 445 may be omitted. Useful examples of the illustrated seller mobile device 110 include, but are not limited to, personal computers, servers, tablet PCs, smartphones, or other computing devices. In some embodiments, multiple seller mobile device 110 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary seller mobile device 110 design may be realized in a distributed implementation. In an illustrative example, some seller mobile device 110 designs may be partitioned between a client device, such as, for example, a phone, and, a more powerful server system, as depicted, for example, in FIG. 2. In various designs, a seller mobile device 110 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some feature s. However, in some embodiments, an exemplary seller mobile device 110 may be configured to operate on a device with less processing power, such as, for example, various gaming consoles, which may not have sufficient processor power, or a suitable CPU architecture, to adequately support seller mobile device 110. Various embodiment designs configured to operate on a such a device with reduced processor power may work in conjunction with a more powerful server system.

Figure 5:
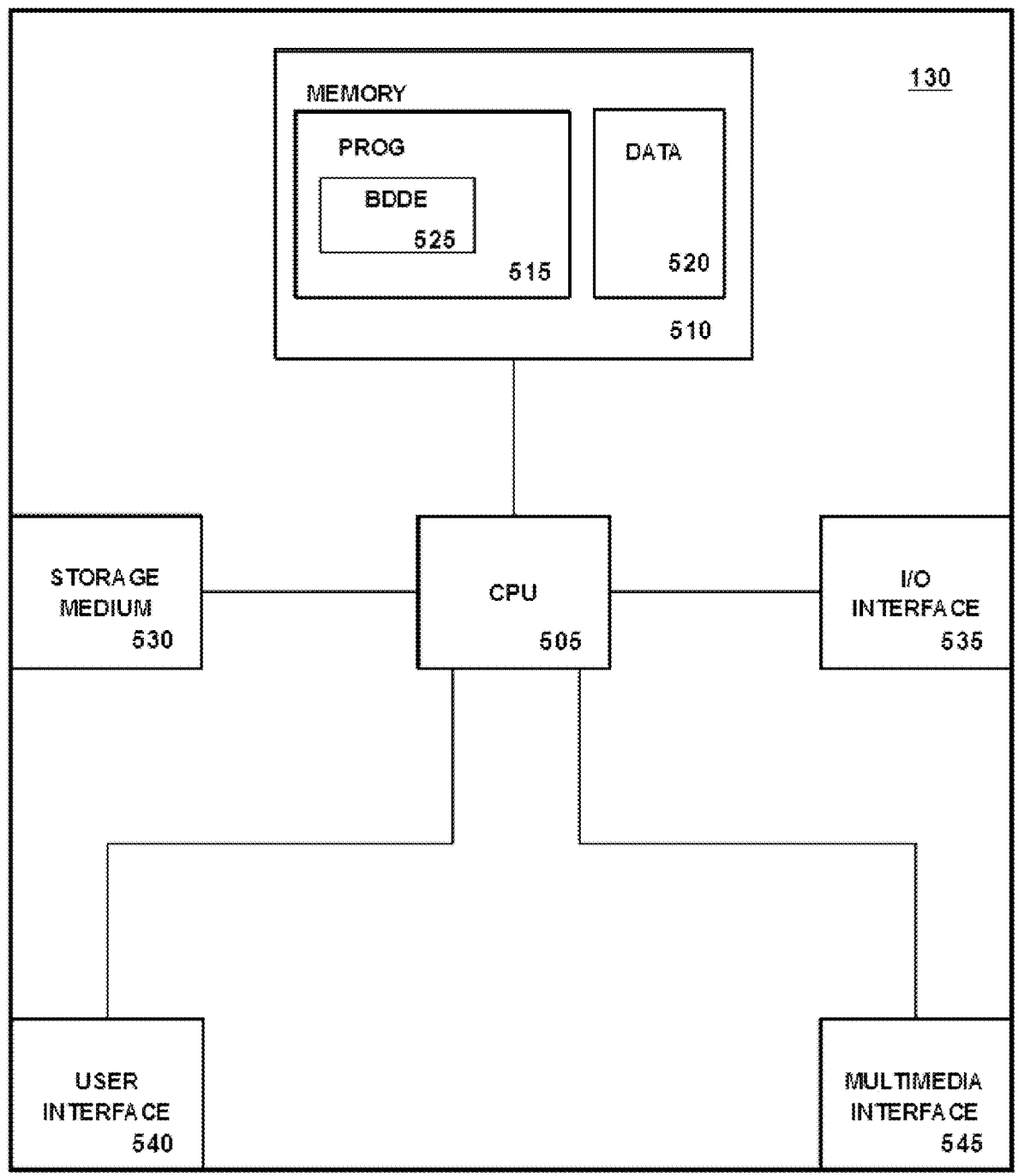
FIG. 5 depicts a structural view of an exemplary buyer discount distribution device configured with an exemplary Buyer Discount Distribution Engine (BDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer.

FIG. 5 depicts a structural view of an exemplary buyer discount distribution device configured with an exemplary Buyer Discount Distribution Engine (BDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. In FIG. 5, the block diagram of the exemplary buyer mobile device 130 includes processor 505 and memory 510. The processor 505 is in electrical communication with the memory 510. The depicted memory 510 includes program memory 515 and data memory 520. The depicted program memory 515 includes processor-executable program instructions implementing the BDDE (Buyer Discount Distribution Engine) 525. In some embodiments, the illustrated program memory 515 may include processor-executable program instructions configured to implement an OS (Operating System). In various embodiments, the OS may include processor executable program instructions configured to implement various operations when executed by the processor 505. In some embodiments, the OS may be omitted. In some embodiments, the illustrated program memory 515 may include processor-executable program instructions configured to implement various Application Software. In various embodiments, the Application Software may include processor executable program instructions configured to implement various operations when executed by the processor 505. In some embodiments, the Application Software may be omitted. In the depicted embodiment, the processor 505 is communicatively and operably coupled with the storage medium 530. In the depicted embodiment, the processor 505 is communicatively and operably coupled with the I/O (Input/Output) interface 535. In the depicted embodiment, the I/O interface 535 includes a network interface. In various implementations, the network interface may be a wireless network interface. In some designs, the network interface may be a Wi-Fi interface. In some embodiments, the network interface may be a Bluetooth interface. In an illustrative example, the buyer mobile device 130 may include more than one network interface. In some designs, the network interface may be a wireline interface. In some designs, the network interface may be omitted. In the depicted embodiment, the processor 505 is communicatively and operably coupled with the user interface 540. In various implementations, the user interface 540 may be adapted to receive input from a user or send output to a user. In some embodiments, the user interface 540 may be adapted to an input-only or output-only user interface mode. In various implementations, the user interface 540 may include an imaging display. In some embodiments, the user interface 540 may include an audio interface. In some designs, the audio interface may include an audio input. In various designs, the audio interface may include an audio output. In some implementations, the user interface 540 may be touch-sensitive. In some designs, the buyer mobile device 130 may include an accelerometer operably coupled with the processor 505. In various embodiments, the buyer mobile device 130 may include a GPS module operably coupled with the processor 505. In an illustrative example, the buyer mobile device 130 may include a magnetometer operably coupled with the processor 505. In some embodiments, the user interface 540 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 505 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 510 may contain processor executable program instruction modules configurable by the processor 505 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 505 to be adapted to provide audio input capability, audio output capability, audio sampling, spectral audio analysis, correlation, autocorrelation, Fourier transforms, audio buffering audio filtering operations including adjusting frequency response and attenuation characteristics of temporal domain and frequency domain filters, audio pattern recognition, or anomaly detection. In various implementations, the depicted memory 510 may contain processor executable program instruction modules configurable by the processor 505 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 505 is communicatively and operably coupled with the multimedia interface 545. In the illustrated embodiment, the multimedia interface 545 includes interfaces adapted to input and output of audio, video, and image data. In some embodiments, the multimedia interface 545 may include one or more still image camera or video camera. In various designs, the multimedia interface 545 may include one or more microphone. In some implementations, the multimedia interface 545 may include a wireless communication means configured to operably and communicatively couple the multimedia interface 545 with a multimedia data source or sink external to the buyer mobile device 130. In various designs, the multimedia interface 545 may include interfaces adapted to send, receive, or process encoded audio or video. In various embodiments, the multimedia interface 545 may include one or more video, image, or audio encoder. In various designs, the multimedia interface 545 may include one or more video, image, or audio decoder. In various implementations, the multimedia interface 545 may include interfaces adapted to send, receive, or process one or more multimedia stream. In various implementations, the multimedia interface 545 may include a GPU. In some embodiments, the multimedia interface 545 may be omitted. Useful examples of the illustrated buyer mobile device 130 include, but are not limited to, personal computers, servers, tablet PCs, smartphones, or other computing devices. In some embodiments, multiple buyer mobile device 130 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary buyer mobile device 130 design may be realized in a distributed implementation. In an illustrative example, some buyer mobile device 130 designs may be partitioned between a client device, such as, for example, a phone, and, a more powerful server system, as depicted, for example, in FIG. 2. In various designs, a buyer mobile device 130 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary buyer mobile device 130 may be configured to operate on a device with less processing power, such as, for example, various gaming consoles, which may not have sufficient processor power, or a suitable CPU architecture, to adequately support buyer mobile device 130. Various embodiment designs configured to operate on a such a device with reduced processor power may work in conjunction with a more powerful server system.

FIG. 6 depicts an exemplary process flow of an embodiment Platform Discount Distribution Engine (PDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. The method depicted in FIG. 6 is given from the perspective of the PDDE 325 implemented via processor-executable program instructions executing on the discount distribution platform 120 processor 305, depicted in FIG. 3. In the illustrated embodiment, the PDDE 325 executes as program instructions on the processor 305 configured in the PDDE 325 host discount distribution platform 120, depicted in at least FIG. 1, FIG. 2, and FIG. 3. In some embodiments, the PDDE 325 may execute as a cloud service communicatively and operatively coupled with system services, hardware resources, or software elements local to and/or external to the PDDE 325 host discount distribution platform 120. The depicted method 600 begins at step 605 with the processor 305 receiving an electronic message comprising an indication of a product for sale at a location and time preferred by the seller. Then, the method continues at step 610 with the processor 305 receiving an electronic message comprising an indication of a product requested at a location and time preferred by the buyer. Then, the method continues at step 615 with the processor 305 receiving an electronic message comprising real-time business intelligence data related to the product for sale. In various embodiments, the real-time business intelligence data related to the product for sale may include the sales rate, inventory level, or location of the product for sale. Then, the method continues at step 620 with the processor 305 associating the requested product with the product for sale at the location and time preferred by the seller. Then, the method continues at step 625 with the processor 305 comparing the associated product demand determined as a function of the real-time business intelligence data to a predetermined threshold, to identify off-peak demand, based on the comparison. Then, the method continues at step 630 with the processor 305 performing a test, to determine if off-peak demand is identified, based on the comparison performed by the processor 305 at step 625. Upon a determination by the processor 305 at step 630 that off-peak demand has not been identified, the method continues at step 635 with the processor 305 performing a test to determine if an end of day offer has been configured for the current time. Upon a determination by the processor 305 at step 625 that an end of day offer has not been configured for the current time, the method continues at step 605 with the processor 305 receiving an electronic message comprising an indication of a product for sale at a location and time preferred by the seller. Upon a determination by the processor 305 at step 630 that off-peak demand has been identified, the method continues at step 640 with the processor 305 sending an electronic message comprising an offer notification including an offer to purchase an off-peak product discount code, and the method continues at step 650. Upon a determination by the processor 305 at step 635 that an end of day offer has been configured for the current time, the method continues at step 645 with the processor 305 sending an electronic message comprising an offer to purchase an end of day product discount code, and the method continues at step 650. At step 650, the processor 305 receives an electronic message comprising payment for the discount code. Then, the method continues at step 655 with the processor 305 sending an electronic message including the discount code. In various embodiments, the method may repeat.

FIG. 7 depicts an exemplary process flow of an embodiment Seller Discount Distribution Engine (SDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. The method depicted in FIG. 7 is given from the perspective of the SDDE 425 implemented via processor-executable program instructions executing on the seller mobile device 110 processor 405, depicted in FIG. 4. In the illustrated embodiment, the SDDE 425 executes as program instructions on the processor 405 configured in the SDDE 425 host seller mobile device 110, depicted in at least FIG. 1, FIG. 2, and FIG. 4. In some embodiments, the SDDE 425 may execute as a cloud service communicatively and operatively coupled with system services, hardware resources, or software elements local to and/or external to the SDDE 425 host seller mobile device 110. The depicted method 700 begins at step 705 with the processor 405 sending an electronic message comprising an indication of a product for sale at a location and time preferred by the seller. Then, the method continues at step 710 with the processor 405 sending an electronic message comprising real-time business intelligence data related to the product for sale. In some embodiments, the real-time business intelligence data related to the product for sale may include the sales rate, inventory level, or location of the product for sale. Then, the method continues at step 715 with the processor 405 receiving an electronic message comprising the discount code and payment for the product. In various implementations, the method may repeat.

FIG. 8 depicts an exemplary process flow of an embodiment Buyer Discount Distribution Engine (BDDE) designed to increase revenue limited by off-peak hour and end of day demand characteristics based on offering a discounted product requested by a buyer, with offer parameters determined as a function of the discounted product request, in response to detecting a predetermined product demand characteristic, and at a location, time, and discount based on the offer. The method depicted in FIG. 8 is given from the perspective of the BDDE 525 implemented via processor-executable program instructions executing on the buyer mobile device 130 processor 505, depicted in FIG. 5. In the illustrated embodiment, the BDDE 525 executes as program instructions on the processor 505 configured in the BDDE 525 host buyer mobile device 130, depicted in at least FIG. 1, FIG. 2, and FIG. 5. In some embodiments, the BDDE 525 may execute as a cloud service communicatively and operatively coupled with system services, hardware resources, or software elements local to and/or external to the BDDE 525 host buyer mobile device 130. The depicted method 800 begins at step 805 with the processor 505 receiving input from the buyer comprising an indication of a product requested at a location, time, and price preferred by the buyer. Then, the method continues at step 810 with the processor 505 sending an electronic message comprising an indication of the product requested at the location and time preferred by the buyer. Then, the method continues at step 815 with the processor 505 receiving an electronic message comprising an offer notification including an offer to purchase a discount code authorizing the buyer to purchase the requested product at a discount price included in the offer. Then, the method continues at step 820, with the processor 505 comparing the discount price with the price preferred by the buyer, to determine if the offer should be accepted, based on the comparison. Then, the method continues at step 825 with the processor 505 performing a test to determine if the offer should be accepted, based on the comparison performed by the processor 505 at step 820. In various embodiments, the test performed by the processor 505 at step 825 to determine if the offer should be accepted may be based on presenting the offer to a user and receiving from the user via a user interface an indication to accept or reject the offer. Upon a determination by the processor 505 at step 825 that the offer should not be accepted, the method continues at step 805 with the processor 505 receiving input from the buyer comprising an indication of a product requested at a location, time, and price preferred by the buyer. Upon a determination by the processor 505 at step 825 that the offer should be accepted, the method continues at step 830 with the processor 505 sending an electronic message comprising payment for the discount code. Then, the method continues at step 835 with the processor 505 receiving an electronic message including the discount code. Then, the method continues at step 840 with the processor 505 sending an electronic message comprising the discount code and payment for the product. In various designs, the method may repeat.

Although various embodiments have been described with reference to the Figures, other embodiments are possible. In some embodiments, method and apparatus implementations configured to associate a product offered by a seller with a product requested by a buyer are described using location-based techniques such as those described with reference to FIGS. 1-10 of U.S. application Ser. No. 16/190,484, titled "Time Critical Inventory Control Systems and Methods," filed by Applicant Live, Inc. on Nov. 14, 2018, Inventor Keith Wong, the entire contents of which are herein incorporated by reference.

For example, operating fixed costs for some industries are high; therefore, during certain off peak hours, the fixed costs, like rent and utilities, can destroy net income when there are no customers. In some scenarios, for some of the same industries, their products or services may have a limited useful life. In an example illustrative of various prior art scenarios, a seller may want to sell their products at a discount before they became unsellable, however the prior art provides no effective solution to automatically and efficiently distribute discounts to increase demand and sell products in off peak and end of day hours, to increase net income.

In an example illustrative of some prior art scenarios, a seller may rely on coupons and advertisement, however, coupons and advertisement may be costly and inflexible, requiring time to organize, and may not be discreet, as a seller may be publicly identified in such prior art discount distribution methods. It may be very hard with prior art discount distribution methods for a seller to promote a small quantity, like 5 pieces of cake, during off peak hours, if they need to lure customers in with an hour.

In an example illustrative of the restaurant business, there may be at least two problems: 1) In between peak hours (Breakfast, Lunch, and Dinner), there may be quiet Off Peak periods when there may be empty tables, or low demand; 2) At the end of a business day, there may be left over products or ingredients that would go useless if not sold before closing.

Some embodiment designs include a new discount distribution platform catered to the food and service industries and all those industries that sell products or services that have substantial fixed costs in running their businesses, or their products or services expire in due time when they are not sold. In various implementations, an embodiment discount distribution platform is two sided: in a typical example, there may be one side composed of buyers and sellers, and a second side that is a discount distribution platform.

In various implementations, an embodiment discount distribution platform may be referred to as ManagerSpecial. In some examples, an embodiment ManagerSpecial implementation may provide at least two promotions, Off Peak specials and End of Day specials.

In an example illustrative of various ManagerSpecial embodiment discount distribution system designs, sellers (for example, restaurants) and buyers may sign up and become seller and buyer members. Sellers may enter their promotions, indicating their discount percentage, quantity, and offer time. Buyers may enter their preferences for food type, minimum discount percentage, offer time, and location. In various examples, an embodiment discount distribution platform may 'push' the Seller offers to the Buyers electronically. Some designs may include a ManagerSpecial app configured in a buyer mobile device, wearable device, tablet, or desktop computer, permitting the buyer to search on the ManagerSpecial app for discounted products.

In some embodiment examples, each offered product may indicate Regular price, Promotion price, quantity available, offer times, or location. In various implementations, a buyer may click in the ManagerSpecial app, and decide to buy the product. In an illustrative example, the buyer may be taken to a payment page, showing the balance available on the buyer's account. In some exemplary scenarios, if the buyer's account has insufficient funds, the buyer may use a credit card to add funds. In various designs, the buyer may select the quantity desired, and click pay, to complete the transaction to purchase the discounted product.

In an embodiment ManagerSpecial discount distribution platform design, the buyer does not pay the full amount of the product, which he will do when he goes to pick up the product. In addition, the buyer only pays a 'service fee' to the ManagerSpecial discount distribution platform to purchase a 'promo' discount code; the discount distribution platform generates the discount code, and debits the Buyer's account for the service fee.

In an illustrative example, the buyer may visit the seller, opening his ManagerSpecial app to provide the discount code to the seller. In some scenarios, the seller may confirm the product discount code by opening his own ManagerSpecial app. The whole time, the ManagerSpecial platform tracks the Buyer's journey and operational intelligence, such as, for example, the quantity ordered, and when the product was picked up. In an illustrative example, the buyer may consume the product/service at a seller's location, as an embodiment discount distribution platform is not limited to discounts for take-out products.

In an illustrative example, the seller may receive a real time report from the discount distribution platform on quantity sold and claimed. In some examples, the seller may receive marketing stats from the discount distribution platform. The buyer only pays the discount distribution platform a service fee for the discount codes, not the product's price; there is no money transferred between the discount distribution platform and seller.

In an illustrative example, a discount distribution platform may provide marketing inducements to encourage buyers to sign up. For example, the discount distribution platform may deposit funds, for example, $10, into a new buyer's account. In some examples, for each referral, the referrer may receive $5, and the referred may receive $15; in another example, for each seller introduced by a buyer, the buyer may receive $30.

Various embodiments of the present disclosure enable automatic discount promotions for a seller's products, based on off-peak or end of day demand characteristics. In an illustrative example, a seller can quickly sign onto an embodiment discount distribution platform, specifying product, quantity and offer time, and the discount distribution platform pushes the news to sellers, who may respond very quickly. Various embodiment discount distribution platforms may provide reduced transaction complexity and increased accounting efficiency, based on eliminating complicated accounting between buyers and sellers, as a result of only charging a buyer a small service fee to generate a discount code.

Some embodiment ManagerSpecial discount distribution platform implementations may generate promotions for a seller on demand, in response to real time sales and product demand data. Unlike coupons, such as, for example, Groupon, the Seller may instantly start and stop a promotion; specify quantity and offer time; prevent discounted buyers from showing up at peak hours; instantly know in real time how many promotions sold, and how many promotions are claimed; adjust price, quantity, and offer time at will in real time, unlike the printed coupons; and, easily create Off Peak promotions and End of Day promotions.

In an illustrative example, various embodiment implementation designs may permit a seller to avoid public broadcast of a discount, based on discreetly targeting and narrow casting a specific discount to a buyer. Various implementations may provide a fast response time, providing rapid conversion from low demand to automatically generated discounts, from discounts to offers with a targeted discount code, to resulting increased revenue to sellers, and income to the distribution platform.

In various examples, a buyer may set notification alarms based on discount percentage, product type, location and offer time, or seller reputation. In an illustrative example, a seller may add or cancel an offer anytime. In some embodiments, the seller does not pay a service fee, as a result of the discount distribution platform charging only the buyer a small service fee to generate a discount code.

Some implementations may provide a seller with statistics on sales, type of products preferred, stars, or rewards. In various designs, a buyer may be offered new products based on past purchases. Various embodiments may create advantageous technical effects applicable to any perishable assets. For example, the empty tables in off peak hours in a restaurant are perishable assets, wherein the restaurant may want to provide those empty tables to prospective diners. In another example, an unsold cake is a perishable asset, which the seller will want to sell before the cake goes stale.

Some embodiment designs may provide increased efficiency of commerce, with increased profit, and a way to better manage the specific product, location, time, and quantity offered for sale in real time based on live data. In various designs, the discount code may be embodied in a buyer's mobile device, permitting the discount code to communicate directly with the buyer or potential buyer, facilitated by the mobile device. For example, the terms of the discount may be adjusted while the buyer is in transit to obtain their discounted product at the location and time selected by the seller, while permitting the buyer to use the same discount code to purchase additional items from the seller during their visit.

Various embodiment designs in accordance with the present disclosure may increase revenue during low demand periods, such as off-peak or end of day times, when the fixed operation cost of a business may consume profit. In various examples, an embodiment discount distribution platform may automatically generate and distribute discounts to interested buyers when low demand is detected. In some designs, low demand may be detected based on sales rate at a specific location, or range of locations. In various embodiments, an off peak special offer notification may be automatically pushed to a buyer shopping for a discount product at a preferred range of locations, prices, or quantities. Various implementations may automatically push an end of day special offer notification to an interested buyer, based on a predetermined end of day time period selected by the seller.

In an example illustrative of the design and operation of various embodiment implementations, a buyer may not pay the platform for product; the buyer paying only directly to the seller, when the buyer picks up the product from the seller. In an illustrative example, an embodiment discount distribution platform may request the buyer to pay a service fee to the discount distribution platform, for the platform to generate a discount code for the buyer. In some embodiment off-peak promotion designs, a seller may confirm a valid discount code, and sell the product at discount. Various embodiment designs include the buyer paying the discount distribution system for a discount code authorizing the buyer to purchase the product at a discount, and the buyer paying the seller for the discounted product.

In various examples, when the seller decides to offer product via an embodiment discount distribution platform, the discount distribution platform pushes product notifications to potential buyers. In some examples, product notifications may include an offer to buy a discount code authorizing the buyer to purchase the product at a discount. In various designs, the discount code may be valid for a limited period of time determined by the seller.

In an example illustrative of the design and operation of an embodiment discount distribution platform, an exemplary discount code in accordance with the present disclosure may be differentiated from a traditional coupon offer. For example, the distribution scope of a traditional coupon offer includes broadcasting the coupon to a wide range of potential buyers, in contrast with the targeted, narrow casted pushed offer notification characteristic of the discount code in accordance with the present disclosure. In an illustrative example, the offer notification characteristic of the discount code in accordance with the present disclosure may be pushed to the mobile device of a single user, or a group of users sharing a common characteristic. For example, some embodiments may push an offer to members of a club, or, for example, occupants of a vehicle moving toward a restaurant with a drive through window, wherein the direction and rate of vehicle travel may be determined from sensor data, or live traffic data.

In various examples, the discount code generated by the discount distribution platform is determined as a function of communication between the discount distribution platform and the buyer. In various embodiments according to the present disclosure, a seller cannot lose anything, as the discount distribution platform charges buyers for the discount code. In some implementations, if a buyer's account balance is zero, the buyer may add funds to the buyer's account. In various embodiments, a discount distribution platform may offer new buyers signing up an account credit, which may be in the form of a monetary deposit to the buyer's account balance. In some embodiment implementations, if a buyer refers a new buyer, the discount distribution platform may add a monetary deposit to the buyer's account balance, as a referral reward.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art nonsensical. Likewise, use of the singular and plural is solely for the sake of illustration and is not to be interpreted as limiting.

In the present disclosure, all embodiments where "comprising" is used may have as alternatives "consisting essentially of" or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

According to an embodiment of the present invention, the system and method may be accomplished through the use of one or more computing devices. As depicted, for example, at least in FIG. 1, FIG. 2, FIG. 3, FIG. 4, and FIG. 5, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiment s of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialize d apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus, comprising:
  a time-valued product discount distribution system configured to increase profit with a demand boosting action executed in response to a product demand characteristic detected by the system, comprising:
    a processor; and,
    a memory that is not a transitory propagating signal, the memory operably coupled with the processor and encoding computer readable instructions, including processor executable program instructions, the computer readable instructions accessible to the processor, wherein the processor executable program instructions, when executed by the processor, cause the processor to perform operations comprising:
      receiving from a buyer an electronic message comprising a request to purchase a product at a location and time based on the request;
      receiving from a seller an electronic message comprising an indication of a product the seller intends to sell at a price determined as a function of time;
      associating the product the seller intends to sell with the request to purchase the product;
      automatically offering the associated product to the buyer, with offer parameters determined as a function of the product request, said offer parameters comprising a time frame for receiving the discounted price and a location for obtaining the product;
    a discount distribution platform configured to detect, in real time, a short fall in demand necessary to consume supply of the product for sale at the location and time requested by the buyer,
    wherein detection is performed using an array of sensors comprising an imaging sensor, audio transducer, radio-frequency detector, and an ultrasonic audio transducer.

2. The apparatus of claim 1, wherein the operations performed by the processor further comprise receiving from the seller an electronic message comprising real time business intelligence data associated with the product the seller intends to sell.

3. The apparatus of claim 2, wherein the operations performed by the processor further comprise detecting a product demand characteristic determined as a function of the real time business intelligence data.

4. The apparatus of claim 3, wherein the associated product is offered to the buyer in response to detecting the product demand characteristic.

5. The apparatus of claim 1, wherein the electronic message comprising a request to purchase a product further comprises product parameters.

6. The apparatus of claim 5, wherein the product parameters include product quantity, product type, product size, and product grade.

7. The apparatus of claim 1, wherein the location and time based on the request further comprises the buyer location determined as a function of sensor data.

8. The apparatus of claim 1, wherein the price determined as a function of time further comprises the function of time based on an off-peak hour or end of day time predetermined by the seller.

9. The apparatus of claim 1, wherein automatically offering the associated product to the buyer, with offer parameters determined as a function of the product request further comprises automatically generating a discount code offering the associated product to the buyer at the discounted price, and at a location and time selected by the seller as a function of the location and time included in the request received from the buyer.

10. An apparatus, comprising:
  a time-valued product discount distribution system configured to increase profit with a demand boosting action executed in response to a product demand characteristic detected by the system, comprising:
    a processor; and,
    a memory that is not a transitory propagating signal, the memory operably coupled with the processor and encoding computer readable instructions, including processor executable program instructions, the computer readable instructions accessible to the processor, wherein the processor executable program instructions, when executed by the processor, cause the processor to perform operations comprising:
      receiving from a buyer an electronic message comprising a request to purchase a product at a location and time included in the request, wherein the location is determined as a function of data captured from a sensor operable by the buyer;
      receiving from a seller an electronic message comprising an indication of a product the seller intends to sell at a price discount determined as a function of time, wherein the price discount determined as a function of time further comprises the function of time based on an off-peak time or end of day time predetermined by the seller;
      receiving from the seller an electronic message comprising real time business intelligence data associated with the product the seller intends to sell, wherein the real time business intelligence data comprises the product sale rate and inventory quantity;

in response to detecting product demand inadequate to consume the product inventory, wherein the product demand is determined as a function of the product sale rate and detected inventory quantity, associating the product the seller intends to sell with the request to purchase the product at the requested location and time; and automatically generating a discount code for a fee to the buyer, offering the associated product to the buyer at the discounted price, and at a location and time selected by the seller as a function of the location and time included in the request received from the buyer; and a discount distribution platform configured to detect, in real time, the inadequate demand for sale at the location and time requested by the buyer, wherein detection is performed using an array of sensors comprising an imaging sensor, audio transducer, radio-frequency detector, and an ultrasonic audio transducer.

11. The apparatus of claim 10, wherein the electronic message comprising a request to purchase a product further comprises product parameters including product quantity, product type, product size, and product grade.

12. The apparatus of claim 10, wherein the time included in the request further comprises a time predetermined by the buyer.

13. The apparatus of claim 12, wherein the time included in the request further comprises a time range.

14. The apparatus of claim 10, wherein the operations performed by the processor further comprise sending to the buyer an electronic message comprising the discount code.

15. The apparatus of claim 10, wherein the operations performed by the processor further comprise receiving from the buyer an electronic message comprising payment for the discount code.

16. The apparatus of claim 10, wherein the operations performed by the processor further comprise sending to the buyer an electronic message comprising a product availability notification based on discount percentage, product type, offer location, offer time, or seller reputation.

17. An apparatus, comprising:

a time-valued product discount distribution system configured to increase profit with a demand boosting action executed in response to a product demand characteristic detected by the system, comprising:

a processor; and, a memory that is not a transitory propagating signal, the memory operably coupled with the processor and encoding computer readable instructions, including processor executable program instructions, the computer readable instructions accessible to the processor, wherein the processor executable program instructions, when executed by the processor, cause the processor to perform operations comprising:

receiving from a buyer an electronic message comprising a request to purchase a product at a location and time included in the request;

receiving from a seller an electronic message comprising an indication of a product the seller intends to sell at a price discount determined as a function of time, wherein the price discount determined as a function of time further comprises the function of time based on an off-peak time or end of day time predetermined by the seller;

receiving from the seller an electronic message comprising real time business intelligence data associated with the product the seller intends to sell, wherein the real time business intelligence data comprises the product sale rate and inventory quantity;

in response to detecting product demand inadequate to consume the product inventory and or better utilize operation capacity, wherein the product demand is determined as a function of the product sale rate and inventory quantity, associating the product the seller intends to sell with the request to purchase the product at the requested location and time;

sending to the buyer an electronic message comprising a product availability notification based on discount percentage, product type, offer location, offer time, or seller reputation, wherein the product availability notification includes an offer to purchase a discount code authorizing the buyer to purchase the discounted product at the requested location and time;

receiving from the buyer an electronic message comprising payment for the discount code; and receiving from the seller an electronic message comprising an indication the buyer completed the discounted product purchase with the discount code; and a discount distribution platform configured to detect, in real time, the inadequate demand for sale at the location and time requested by the buyer, wherein detection is performed using an array of sensors comprising an imaging sensor, audio transducer, radio-frequency detector, and an ultrasonic audio transducer.

18. The apparatus of claim 17, wherein the memory further encodes data representing the buyer's account.

19. The apparatus of claim 18, wherein the operations performed by the processor further comprise: receiving from the buyer an electronic message including the identity of another potential user referred by the buyer; and, in response to receiving the identity of the potential user referred by the buyer, adding funds to the buyer's account.

20. The apparatus of claim 17, wherein the discount code authorizing the buyer to purchase the discounted product at the requested location and time further comprises the requested location and time selected by the seller as a function of the location and time included in the request received from the buyer.

* * * * *